Figure 1:
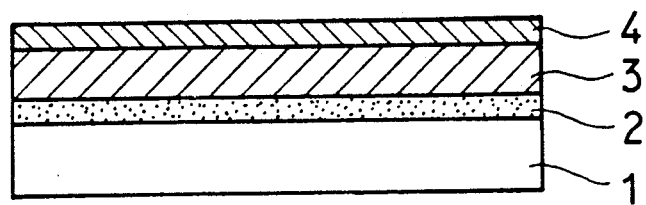

United States Patent [19]

Tomiyama et al.

[11] Patent Number: 5,035,934
[45] Date of Patent: Jul. 30, 1991

[54] ADHESIVE SHEET FOR PREVENTING ICING

[75] Inventors: Takeshi Tomiyama, Hiratsuka; Sadaaki Hashimoto, Chofu; Heihachi Murase, Kanagawa, all of Japan

[73] Assignee: Kansai Paint Company, Limited, Hyogo, Japan

[21] Appl. No.: 436,997

[22] Filed: Nov. 15, 1989

[30] Foreign Application Priority Data

Nov. 26, 1988 [JP] Japan .................................. 299300

[51] Int. Cl.$^5$ .................. B32B 7/06; B32B 7/12; C09K 3/18
[52] U.S. Cl. .................. 428/40; 428/421; 428/422; 106/13
[58] Field of Search ........... 428/40, 421, 422; 106/13

[56] References Cited

U.S. PATENT DOCUMENTS 2,529,585 11/1950 Austin et al. ................ 428/40
4,685,967 8/1987 Enjo et al. .................... 106/13

FOREIGN PATENT DOCUMENTS

339583A2 11/1989 European Pat. Off. .

Primary Examiner—Alexander S. Thomas
Attorney, Agent, or Firm—Armstrong, Nikaido, Marmelstein, Kubovcik & Murray

[57] ABSTRACT

Disclosed is an adhesive sheet for preventing icing, the sheet being characterized in that the sheet comprises a release sheet (1), a pressure-sensitive adhesive layer (2) formed on the sheet (1), a base sheet (3) adhered to the layer (2) and an anti-icing layer (4) formed on the base sheet (3) and that the anti-icing layer (4) is formed from a composition (A) or a composition (B), the composition (A) consisting essentially of:

(a) a copolymer having hydroxyl, or hydroxyl and other reactive group and comprising an essential monomer components a fluoroolefin and a vinyl monomer having hydroxyl and copolymerizable with the fluoroolefin, (b) a silicone compound represented by the formula

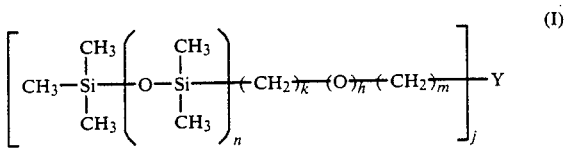

wherein n is an integer of 6 to 300, k is an integer of 0 to 6, h is 0 or 1, m is an integer of 0 to 6, j is 1 or 2, and Y is hydroxyl, carboxyl, epoxy, or a monovalent or bivalent groups containing one or two free isocyanate groups, and (c) a polyisocyanate compound, and the composition (B) consisting essentially of:

(d) a graft copolymer prepared by reacting the component (a) and the component (b), and (c) the polyisocyanate compound.

12 Claims, 1 Drawing Sheet

ADHESIVE SHEET FOR PREVENTING ICING

The present invention relates to an adhesive sheet for preventing icing.

Attempts have been made to prevent articles from icing by coating the articles with coating compositions to form coatings having reduced susceptibility to icing. We conducted basic research on the mechanism of icing and already proposed an anti-icing composition capable of breaking hydrogen bonds and comprising an alkali metal compound and an organopolysiloxane resin (Japanese Unexamined Patent Publication No. 25868/1984) and an antiicing organic coating composition comprising an organic solvent-type synthetic resin coating composition and a polymer of perfluoroalkyl-containing acrylic or methacrylic monomer (Japanese Unexamined Patent Publication No. 23656/1986). These compositions have improved anti-icing property compared with conventional compositions, but are unsatisfactory for practical use and involve the problems of poor flexibility and low adhesion to the articles to be coated.

These compositions have further drawbacks of (1) containing a large quantity of volatile organic solvent, hence undesirable from viewpoints of safety and hygiene, (2) necessitating much labor and time for coating operation, (3) having a coating efficiency variable depending on the temperature and (4) entailing difficulty in forming coatings of same quality depending on a difference in climate.

It is an object of the present invention to provide an anti-icing adhesive sheet capable of forming an anti-icing layer which is outstanding in adhesion, abrasion resistance, film properties, weatherability and the like and which is capable of sustaining the desired anti-icing property for a long term.

It is another object of the invention to provide an anti-icing adhesive sheet capable of easily forming an anti-icing layer and unlikely to impair the safety, hygiene and work environment when the sheet is attached to articles.

These and other objects of the invention will become apparent from the following description.

According to the invention, there is provided an adhesive sheet for preventing icing, the sheet being characterized in that the sheet comprises a release sheet (1), a pressure-sensitive adhesive layer (2) formed on the sheet (1), a base sheet (3) adhered to the layer (2) and an anti-icing layer (4) formed on the base sheet (3) and that the anti-icing layer (4) is formed from a composition (A) or a·composition (B), the composition (A) consisting essentially of:

(a) a copolymer having hydroxyl, or hydroxyl and other reactive group and comprising as essential monomer components a fluoroolefin and a vinyl monomer having hydroxyl and copolymerizable with the fluoroolefin, (b) a silicone compound represented by the formula

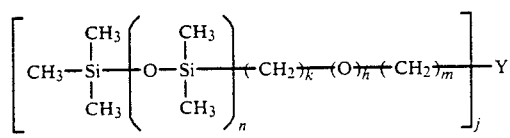

wherein n is an integer of 6 to 300, k is an integer of to 6, h is 0 or 1, m is an integer of 0 to 6, j is 1 or 2, and Y is hydroxyl, carboxyl, epoxy, or a monovalent or bivalent group containing one or two free isocyanate groups, and (c) a polyisocyanate compound, and the composition (B) consisting essentially of:

(d) a graft copolymer prepared by reacting the component (a) and the component (b), and (c) the polyisocyanate compound.

We conducted extensive research and found that a layer formed from the composition (A) comprising the copolymer (a), silicone compound (b) and polyisocyanate compound (c), or the composition (B) comprising the graft copolymer (d) of the copolymer (a) with the silicone compound (b) and the polyisocyanate compound (c) has an excellent anti-icing property, and other desired properties including physical properties and a high adhesion to articles to be protected. The laminate sheet of the invention prepared by forming a anti-icing layer from such composition on the sheet comprising the release sheet, adhesive layer and base sheet is adhered to the article by a simple procedure, i.e. by peeling the release sheet and attaching the adhesive layer to the article to provide the layer of excellent anti-icing property on the article.

Figure 2:
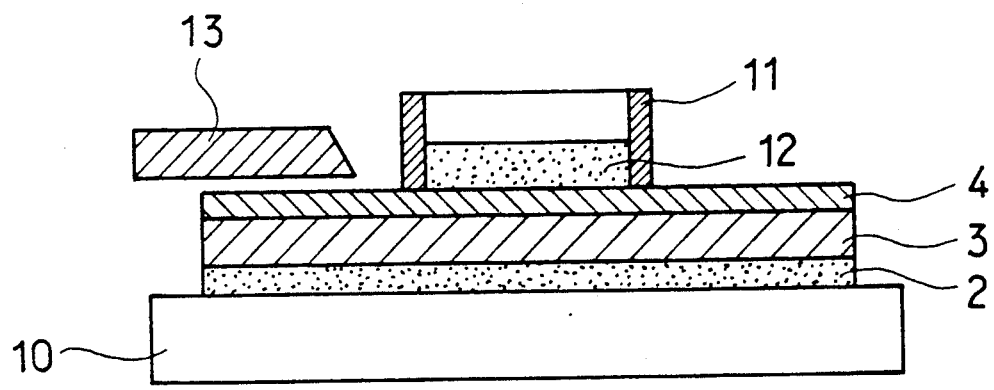

The anti-icing adhesive sheet of the invention will be described below in greater detail with reference to the accompanying drawings in which:

FIG. 1 is a sectional view of the anti-icing adhesive sheet of the invention; and FIG. 2 is a sectional view showing a device for testing anti-icing adhesive sheets for the anti-icing property.

The release sheet (1) is attached to one side of the pressure-sensitive adhesive layer (2) and is easily separable from the adhesive layer (2). The release sheet (1) is peeled off before adhering the anti-icing adhesive sheet of the invention to the article to be applied therewith. The release sheet (1) can be any of conventional release sheets and films including those prepared by coating or impregnating a paper sheet or a film with a releasant such as silicone, wax or fluorine resin; and films of synthetic resins having themselves releasability, such as polypropylene, polyethylene or the like. A suitable thickness of the release sheet (1) is about 80 to about 200 μm.

The adhesive layer (2) is used to attach to the article the base sheet (3) having the anti-icing layer (4) formed thereon, and is present between the release sheet (1) and the base sheet (3). The adhesive composition to be used for forming the layer (2) contains as the main component a conventional permanent adhesive agent such as natural rubber, styrene-butadiene copolymer rubber, polyisobutylene, acrylic resin, polyvinyl ether, polyvinyl isobutyl ether, etc. Among them, preferable are polybutyl acrylate, poly-2-ethylhexyl acrylate and like acrylic resins which have a glass transition temperature of $-10°$ to $-60°$ C. The adhesive composition may further contain a tackifier such as rosin, rosin ester, cumarone resin, terpene resin, hydrocarbon resin, oil-soluble phenolic resin or the like, and a softening agent such as fatty acid ester, animal or plant fats and oils, wax, petroleum heavy oil fraction or the like, when required depending on the compatibility with the adhesive agent used as the main component. The adhesive composition may also contain a filler, pigment, age resister, stabilizer and the like.

While the adhesive composition usually contains the adhesive agent as dissolved or dispersed in an organic solvent, the adhesive agent may be contained as melted without use of organic solvent.

The adhesive layer (2) can be formed by applying the adhesive composition to one side of a prime-coated or surface-treated base sheet (3) with use of a knife coater, roll coater or gravure coater, followed by evaporation of the volatile substance such as an organic solvent. The layer (2) has a thickness of about 1 to about 500 μm, preferably about 20 to about 40 μm.

When the adhesive sheet of the invention is to be adhered to the article at a low environmental temperature, it is preferred to form the layer (2) having a low glass transition temperature.

The base sheet (3) is present between the adhesive layer (2) and the anti-icing layer (4) and is used to reinforce and retain the physical properties of the layer (4). The base sheet (3) is preferably excellent in resistance to cold, heat, contraction and chemicals, flexibility, weatherability and the like and is desirably formed from polyurethane, polyimide, nylon, polyethylene, polyester, polycarbonate, plasticated vinyl chloride resin, metal or the like.

The base sheet (3) preferably has a thickness of about 1 to about 1,000 μm, preferably about 30 to about 120 μm, and may be transparent or opaque. Preferred base sheet (3) is one easy to cut.

The anti-icing layer (4) is formed on one side of the base sheet (3) and capable of preventing snow or ice from attaching or firmly adhering to the article. The layer (4) can be produced by applying the composition (A) or the composition (B) onto one side of the base sheet (3).

Composition (A)

The composition (A) consists essentially of:
(a) a copolymer having hydroxyl, or hydroxyl and other reactive group and comprising as essential monomer components a fluoroolefin (a-1) and a vinyl monomer (a-2) having hydroxyl and copolymerizable with the fluoroolefin,
(b) a silicone compound represented by the formula

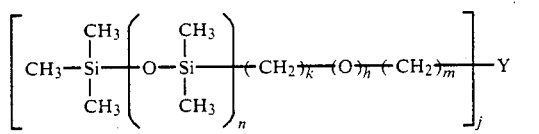

wherein n is an integer of 6 to 300, k is an integer of 0 to 6, h is 0 or 1, m is an integer of 0 to 6, j is 1 or 2, and Y is hydroxyl, carboxyl, epoxy, or a monovalent or bivalent group containing one or two free isocyanate groups, and
(c) a polyisocyanate compound.

The above copolymer (component (a)) comprises a fluoroolefin (a-1) as one of its monomer components. Examples of useful fluoroolefins are hexafluoropropene, tetrafluoroethylene, monochlorotrifluoroethylene, dichlorodifluoroethylene, 1,2-difluoroethylene, vinylidene fluoride, monofluoroethylene and the like. Of these olefins, tetrafluoroethylene and monochlorotrifluoroethylene are especially desirable in view of copolymerizability.

Examples of vinyl monomers (a-2) having hydroxyl and copolymerizable with the fluoroolefin (a-1) to form the copolymer (a) are hydroxyl-containing vinyl ethers such as hydroxyethyl vinyl ether, hydroxypropyl vinyl ether, hydroxybutyl vinyl ether, hydroxyhexyl vinyl ether and hydroxypentyl vinyl ether; hydroxyl-containing (meth)acrylates such as 2-hydroxyethyl acrylate, 2-hydroxyethyl methacrylate, hydroxypropyl acrylate and hydroxypropyl methacrylate; etc. Among these examples, hydroxyl-containing vinyl ethers having a hydroxyalkyl ether group with alkyl moiety of 2 to 6 carbon atoms are especially desirable from the viewpoint of copolymerizability.

While the copolymer (a) consists essentially of the fluoroolefin (a-1) and the vinyl monomer (a-2), other monomers (a-3) may be copolymerized with these monomers when required. Examples of such monomers are vinyl ethers having an alkyl group such as methyl, ethyl, propyl, isobutyl, n-butyl, hexyl, octyl, decyl or lauryl, or an alicyclic group such as cyclobutyl, cyclopentyl, cyclohexyl, adamantyl or bornyl; (meth)acrylate alkyl esters having an alkyl with 1 to 18 carbon atoms; glycidyl (meth)acrylate; vinyl esters such as vinyl acetate, vinyl propionate, vinyl butyrate, vinyl pivalate, vinyl caproate, vinyl laurate, vinyl ester of versatic acid and vinyl cyclohexanecarboxylate; α-olefins such as ethylene, propylene, isobutylene and butene-1; etc. Among these monomers, it is desirable to use vinyl ethers having an alkyl ether group with 2 to 6 carbon atoms and cyclohexyl vinyl ether in view of copolymerizability.

The copolymer (a) has the hydroxyl due to the presence of the hydroxyl-containing vinyl monomer or may have the hydroxyl and a reactive group other than the hydroxyl. Examples of such reactive groups other than hydroxyl are carboxyl, epoxy and the like. Carboxyl can be introduced into the copolymer (a), for example, by reacting a dibasic acid anhydride with the hydroxyl of the copolymer (a) of fluoroolefin and hydroxyl-containing vinyl monomer or with the hydroxyl of the copolymer (a) obtained by copolymerizing these monomers with other monomer. Epoxy can be introduced into the copolymer (a), for example, by preparing the copolymer (a) using as a monomer component thereof an epoxy-containing vinyl monomer such as glycidyl (meth)acrylate.

To prepare the copolymer (a), the monomers are used preferably in the following proportions.

| | |
|---|---|
| Fluoroolefin (a-1) | 20 to 99 mole % |
| Hydroxyl-containing vinyl monomer (a-2) | 1 to 80 mole % |
| Other monomers (a-3) (based on the combined amount of the components (a-1) and (a-2)) | 0 to 80 mole % |

The copolymerization reaction for preparing the copolymer (a) is conducted usually in an organic solvent at a temperature of about −20° to about 150° C. at atmospheric pressure to an elevated pressure of up to about 30 kg/cm²G using usually about 0.01 to about 5 parts by weight of a polymerization initiator per 100 parts by weight of the combined amount of monomers.

The copolymer (a) is preferably about 2000 to about 100000, more preferably about 5000 to about 60000, in number average molecular weight. If the molecular weight is too low, the anti-icing layer (4) tends to have lower water resistance and impaired properties, whereas if it is too high, the copolymer tends to exhibit an excessively higher viscosity when dissolved and becomes inconvenient to handle. The copolymer (a) preferably has a hydroxy value of about 30 to about 400 mg KOH/g, more preferably 40 to 300 mg KOH/g. When the hydroxy value is too low, the copolymer coating will not be fully curable, rendering the antiicing layer (4) insufficiently crosslinkable, whereas if the value is too high, the antiicing layer (4) tends to be lower in water resistance and properties.

The component (b) is a silicone compound represented by the following formula (I).

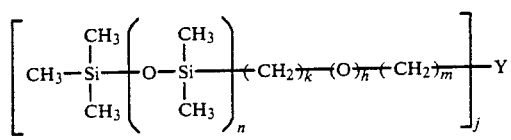

wherein n is an integer of 6 to 300, k is an integer of 0 to 6, h is 0 or 1, m is an integer of 0 to 6, j is 1 or 2, and Y is hydroxyl, carboxyl, epoxy, or a monovalent or bivalent group containing one or two free isocyanate groups.

The component (b) has a structural portion (hereinafter referred to as "polymethylsiloxane chain") represented by the formula

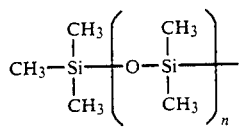

wherein n is as defined above. This chain imparts a slipping property and reduced surface tension to the coating and is effective for preventing adhesion of ice thereto.

The component (b) also has a group represented by Y in the formula (I) in addition to the polymethylsiloxane chain. The group Y is hydroxyl, or a group which is selected from carboxyl, epoxy and a monovalent or bivalent group containing one or two free isocyanate groups and which is reactive with the hydroxyl or other reactive groups in the copolymer (a). Thus, it is essential that the component (b) have hydroxyl or a group reactive with the hydroxyl or other group in the copolymer (a). The component (b) is reacted in coatings with the component (a) by direct grafting and/or coupled with the component (a) by means of a polyisocyanate compound as the component (c) to result in the coatings having an improved anti-icing property, ability to retain this property for a long term, enhanced adhesion to the article and improved physical properties.

Table 1 shows the typical combinations of the reactive groups respectively present in the component (a) and the the component (b).

TABLE 1

| Reactive groups in component (a) | Reactive groups in component (b) |
| --- | --- |
| Hydroxyl | Isocyanate |
|  | Carboxyl |
| Carboxyl | Epoxy |
|  | Hydroxyl |
| Epoxy | Carboxyl |

Of the combinations of reactive groups given in Table 1 above, the combination of hydroxyl in (a) and isocyanate in (b), and the combination of carboxyl in (a) and epoxy in (b) are suitable in view of the reactivity and ease of preparation.

Preferably the composition (A) contains the component (b) having as the reactive group an isocyanate group in view of the reactivity of the component (b) in curing.

Examples of preferred silicone compounds (b) wherein Y is hydroxyl, carboxyl or epoxy are α-trimethyl-ω-[3-(2-carboxyethoxy)propyl]polydimethylsiloxane, α-trimethyl-ω-[3-(carboxymethoxy)propyl]-polydimethylsiloxane, α-trimethyl-ω-[3-(glycidyloxy)-propyl]-polydimethylsiloxane, α-trimethyl-ω-[3-(2-hydroxyethoxy)-propyl]polydimethylsiloxane, α-trimethyl-ω-[3-(hydroxymethoxy)propyl]polydimethylsiloxane, α-trimethyl-ω-[4-(2-hydroxyethoxy)butyl]polydimethylsiloxane and the like. Among these, preferable are α-trimethyl-ω-[3-(carboxymethoxy)propyl]-polydimethylsiloxane, α-trimethyl-ω-[3-glycidyloxy)-polydimethylsiloxane, α-trimethyl-ω-[3-hydroxypropyl]polydimethylsiloxane, α-trimethyl-ω-[3-hydroxymethoxy)propyl]polydimethylsiloxane, etc.

When Y is an isocyanate-containing group, this group is monovalent or bivalent and may contain one or two free isocyanate groups. Compounds (b) wherein Y is an isocyanate-containing group can be prepared from a compound having the polymethylsiloxane chain and an active hydrogen-containing group and represented by the formula

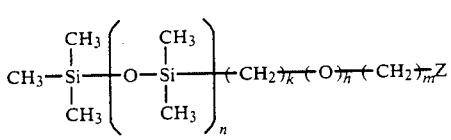

wherein Z is the active hydrogen-containing group, and n, k, h and m are as defined above, by reacting the active hydrogen of the compound (II) with one or some isocyanate groups of a polyisocyanate compound.

The active hydrogen-containing group represented by Z is, for example, hydroxyl, amino, etc. Such compounds wherein the active hydrogen-containing group is hydroxyl can be those exemplified as compounds of the formula (I) wherein Y is hydroxyl.

Exemplary of the polyisocyanate compound to be reacted with the compound (II) having the polymethylsiloxane chain are those already known, such as aromatic, alicyclic or aliphatic polyisocyanates including tolylene diisocyanate, xylene diisocyanate, phenylene diisocyanate, bis(isocyanatemethyl)cyclohexane, tetramethylene diisocyanate, hexamethylene diisocyanate, isophorone diisocyanate, hydrogenated diphenylmethane diisocyanate, diphenylmethane diisocyanate, polymers of the above exemplified polyisocyanates such as triisocyanurate, etc. Also usable are compounds having a terminal isocyanate group and prepared by reacting a low-molecularweight compound having active hydrogen, such as ethylene glycol, propylene glycol, trimethylolpropane, hexanetriol or castor oil, with an excess of such a polyisocyanate compound. Among these polyisoyanate compounds, especially desirable is isophorone diisocyanate.

Depending on the kind and proportion of each of the compound (II) having a polymethylsiloxane chain and the polyisocyanate compound reacted therewith, Y in the formula (I) represents a monovalent or bivalent group having one or two free isocyanate groups and represented by 

or $-R_3(NCO)_2$, wherein $R_1$, $R_2$ and $R_3$ each means a coupled portion resulting from the reaction of at least one isocyanate group of the polyisocyanate compound with the active hydrogen-containing group of the compound (II), in combination with the portion of the polyisocyanate compound other than the remaining free isocyanate group or groups.

For example, Y which is $-R_1-N=C=O$ results from the reaction of 1 mole of a diisocyanate compound with 1 mole of a compound (II) having one polymethylsiloxane chain and one group (e.g. hydroxyl) having active hydrogen, and $R_1$ in the group Y represents a coupled portion (e.g. $-NHCOO-$) obtained by the reaction of one isocyanate group in the diisocyanate compound with the active hydrogen-containing group (e.g. $-OH$) of the compound (II), as combined with the portion of the diisocyanate compound other than the remaining free isocyanate group.

Similarly, Y which is

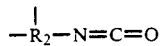

results, for example, from the reaction of 1 mole of a triisocyanate compound with 2 moles of a compound (II) having one polymethylsiloxane chain and one group (e.g. hydroxyl) having active hydrogen, and $R_2$ in the group Y represents a coupled portion obtained by the reaction of two isocyanate groups in the triisocyanate compound with the active hydrogen-containing group of the compound (II), as combined with the portion of the triisocyanate compound other than the remaining free isocyanate group.

Further Y which is $-R_3-(N=C=O)_2$ results, for example, from the reaction of 1 mole of a triisocyanate compound with 1 mole of a compound (II) having one polymethylsiloxane chain and one group (e.g. hydroxyl) having active hydrogen, and $R_3$ in the group Y represents a coupled portion of one isocyanate group in the triisocyanate compound and the active hydrogen-containing group of the compound (II), as combined with the portion of the triisocyanate compound other than the remaining two free isocyanate groups.

An example of silicone compound (b) wherein Y is

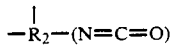

can be prepared from an adduct obtained from 3 moles of 1,6-hexamethylene diisocyanate and 1 mole of hexanetriol, by reacting 2 moles of a silicone compound having one hydroxyl group and one polymethylsiloxane chain in the molecule with one mole of the adduct. The silicone compound thus prepared has one isocyanate group and two polymethylsiloxane chains in the molecule.

An example of silicone compound (b) wherein Y is $-R_3-(N=C=O)_2$ can be prepared from an adduct obtained from 3 moles of 1,6-hexamethylene diisocyanate and 1 mole of trimethylolpropane, by reacting 1 mole of a silicone compound having one hydroxyl group and one polymethylsiloxane chain in the molecule with one mole of the adduct. The silicone compound (b) thus prepared has two isocyanate groups and one polymethylsiloxane chain in the molecule.

The component (b) is preferably about 520 to about 60000, more preferably about 800 to about 20000, in number average molecular weight. If the molecular weight is too low, a reduced effect to prevent icing tends to result, whereas if it is too high, the compound (b) tends to become less compatible with the component (a) and less reactive.

Known polyisocyanate compounds are usable as the component (c). Examples of useful polyisocyanate compounds are aromatic, alicyclic or aliphatic polyisocyanate comopunds such as tolylene diisocyanate, xylylene diisocyanate, phenylene diisocyanate, bis-(isocyanatemethyl)cyclohexane, tetramethylene diisocyanate, hexamethylene diisocyanate, isophorone diisocyanate, hydrogenated diphenylmethane diisocyanate, diphenylmethane diisocyanate; compounds having a terminal isocyanate group and prepared by reacting a low-molecular-weight compound having active hydrogen, such as ethylene glycol, propylene glycol, trimethylolpropane, hexanetriol or castor oil, with an excess of such a polyisocyanate compound; and blocked polyisocyanate compounds obtained by blocking such unblocked polyisocyanate compounds with an isocyanate blocking agent.

Examples of useful isocyanate blocking agents are phenols such as phenol, m-cresol, xylenol and thiophenol, alcohols such as methanol, ethanol, butanol, 2-ethylhexanol, cyclohexanol and ethylene glycol monomethyl ether, active hydrogen-containing compounds such as caprolactam, ethyl acetoacetate and diethyl malonate.

With the use of the blocked polyisocyanate serving as the component (c), the coating composition which would otherwise be of the three-package type can then be of the two-package type, or can be of the single-package type instead of the two-package type.

The composition (A) consists essentially of the above components (a), (b) and (c) and these components are preferably used in the following proportions calculated as solids, based on the combined amount of the three components.

| | |
|---|---|
| Component (a) | 30 to 90 wt. % |
| Component (b) | 1 to 40 wt. % |
| Component (c) | 5 to 50 wt. % |

If the proportion of the component (a) is too small, the anti-icing layer (4) tends to exhibit lower physical strength, whereas if it is too large, increased icing strength is likely to result.

With too a small amount of the component (b) used, the composition tends to exhibit a reduced effect to prevent icing, whereas with an excessive amount of the component (b) used, the anti-icing layer (4) has a tacky surface and exhibits lower physical strength. With too a small amount of the component (c) used, the composition has lower crosslinking density, giving the anti-icing layer (4) of impared physical properties and of reduced adhesion to the base sheet (3). On the other hand, with an excessive amount of the component (c) present, the anti-icing layer (4) formed has too high a crosslinking density and is hard and brittle, further exhibiting a reduced anti-icing property.

Composition (B)

The composition (B) contains as the main components the graft copolymer (d) prepared by reacting the components (a) and (b), and the polyisocyanate compound (c).

The graft copolymer (d) is a reaction product in which the polymethylsiloxane chain of the component (b) is present at the side chain of the component (a).

In reacting the component (b) with the component (a) for grafting, it is desirable to react about 1 to about 58% by weight of the component (b) with about 42 to about 99% by weight of the component (a) based on the combined amount of both components. When the reaction ratio is outside this range, the component (a) or (b) fails to fully exhibit its advantage to result in a tendency toward reduced ability to prevent icing.

The known grafting methods can be suitably employed depending on the kind of reactive groups in the components (a) and (b).

For example, the hydroxyl group of the component (a) is reacted with the isocyanate group in the component (b) for grafting by the following process. First, 1 mole of a diisocyanate compound is reacted with heating with 1 mole of a silicone compound having one polymethylsiloxane chain and one hydroxyl group in the molecule in the presence of an organic metal catalyst to obtain the compound (b) having one polymethylsiloxane chain and one free isocyanate group.

The component (b) is then reacted with the component (a) which contains an excessive amount of hydroxyl groups relative to the isocyanate group in the component (b) with heating in the presence of an organic metal catalyst to effect grafting. This reaction gives a comb-shaped polymer comprising the component (a) having hydroxyl with the component (b) grafted thereto as a side chain.

Useful organic metal catalysts for use in the above reactions are dibutyl tin acetate, dibutyl tin laurate and like organic tin compounds, zinc octylate and like organic zinc compounds.

Use of the graft copolymer of the components (a) and (b) results in higher compatibility and permits the final coating to more readily contain the silicone component on the side chain of the component (a) as designed than use of a mixture of components (a) and (b) without grafting.

With use of the graft copolymer, polymethylsiloxane chains are distributed throughout the coating uniformly, permitting the coating to retain an anti-icing property with good stability when exposed to weather over a prolonged period of time. Further the blocked polyisocyanate compound, when used as the component (c), provides a composition of the single-package type.

The coating composition of the single-package type is usable without giving consideration to the pot lift thereof, remains free of gelation even if partly left unused and is therefore advantageous from the viewpoint of cost.

It is desirable to use the grafted component (d) and the component (c) in the following proportions calculated as solids based on the combined amount thereof.

| Component (d) | 50 to 95 wt. % |
|---|---|
| Component (c) | 5 to 50 wt. % |

When the amount of the component (c) is too small (i.e., when the amount of the component (d) is excessive), the anti-icing layer (4) tends to exhibit impaired physical properties and lower adhesion to the base sheet, whereas with an excessive amount of the component (c) present (with too small an amount of the component (d) present), the resulting anti-icing layer (4) tends to become hard and brittle and exhibits a reduced anti-icing property.

The composition (A) comprises the aforementioned components (a), (b) and (c) as its essential vehicle components and the composition (B) comprises the components (d) and (c) as its essential vehicle components. When required, it is possible to incorporate into these compositions known coloring pigments, extender pigments, corrosion inhibiting pigments, dyes, etc. which are generally used for coating compositions, in an amount of up to about 120 parts by weight per 100 parts by weight of resin calculated as solids. Also usable is liquid paraffin or like paraffin substances for permitting the coating to have more sustained ability to prevent icing and to reduce shear strength at the ice-coating interface. Further usable are other suitable surfactants and additives.

The compositions (A) and (B) are prepared by admixing the aforementioned essential components or, when required, by admixing other components with essential ones. The components are mixed together by usual agitating or dispersing means such as dissolver, steel ball mill, pebble mill, sand mill, attritor mill or the like. For preparing the composition (A) or (B), the components are dissolved in a suitable organic solvent. The solvent is preferably one capable of dissolving the resin components, such as chain or cyclic hydrocarbons, ketones, esters, alcohols and like solvents which are used for common coating compositions. When unblocked isocyanate groups are present in the system, it is desirable to avoid the use of alcohol solvents.

The anti-icing adhesive sheet of the invention is useful for covering a substrate to be protected against snow or ice accumulating thereon or adhering thereto in cold climate, such as radar, side lights, bridges and life-saving devices in vessels; wings, cargoes and drains in aircraft; floating marine structures including rigs and buoys; undersides of cars, car steps and pantographs in railway cars; communication devices including antennas and radar; traffic control signs; pans, pipes, ice boxes and fans in refrigerators; etc.

According to the invention, the anti-icing layer (4) is formed by appling the above composition (A) or (B) on one side of the base sheet (3) where the adhesive layer (2) is formed on the other side. For coating, the composition (A) or (B) can be applied using known methods or means such as spray coating, brush coating, roller coating, roll coating, dip coating, curtain flow coater and the like.

The anti-icing layer (4) is usually applied to a thickness of about 5 to about 100 μm, preferably 10 to 50 μm, when dried. A satisfactory anti-icing layer can be obtained under suitably selected coating and drying conditions, for example, by drying at room temperature to about 300° C., preferably at about 80° to about 250° C., for about 30 seconds to about 40 minutes.

As shown in FIG. 1, the anti-icing layer (4) is formed on one side of the base sheet (3), the adhesive layer (2) is formed on the other side of the base sheet (3), and the release sheet (1) is adhered to the other side of the layer (2).

Optionally a layer of high weatherability may be formed between the base sheet (3) and the anti-icing layer (4).

For use, the anti-icing adhesive sheet of the invention is cut to the desired shape and size, the release sheet (1) is peeled off, and the anti-icing adhesive sheet is attached to the article. Thereby the anti-icing layer (4) is caused to constitute the outermost part of the sheet so that snow and ice will not cling or stick to the exposed layer (4) or could be easily removed should they stick thereto.

The anti-icing adhesive sheet of the invention can achieve the following results.

(1) The anti-icing sheet of the invention period for application, compared with coating operation.

(2) The anti-icing sheet of the invention need not apply a coating composition to the article, consequently contributing to marked improvements in safety, hygiene and work environment.

(3) The anti-icing layer (4) retains the desired anti-icing property for a long term and is outstanding in adhesion, abrasion resistance, film properties and weatherability.

(4) If the adhesive layer (2) is so formed as to sustain the properties for substantially the same period as the anti-icing layer (4) according to the purpose of use of the sheet, repair work is extremely facilitated.

EXAMPLES

The invention will be described below in greater detail with reference to the following examples in which the parts and percentages are all by weight unless otherwise specified. I Preparation Example of Anti-icing Composition 1. Preparation of the component (a)

1) Component (a-1)

Into a 1000-ml glass autoclave were placed 20 parts of 3-hydroxypropyl vinyl ether (hereinafter referred to as "HPVE"), 64.3 parts of xylene, 21.4 parts of methyl isobutyl ketone and 0.36 part of N-dimethylbenzylamine, the interior air was replaced by nitrogen, 80 parts of vinylidene fluoride was added, and the mixture was heated to 65° C. The pressure of the autoclave was 6.2 kg/cm$^2$G when the temperature became stabilized. Subsequently, 14.3 parts of xylene/methyl isobutyl ketone mixture (3/1 in weight ratio) having 0.9 part of azobisisobutyronitrile dissolved therein was added to the mixture to initiate polymerization. The system was maintained at 65° C. with stirring for 20 hours. Twenty hours after the initiation of the reaction, the pressure of the autoclave was 0.2 kg/cm$^2$G.

The reaction gave a varnish containing a fluoroolefin copolymer and having a solids content of about 50%. The hydroxy value of the copolymer (resin solids) was about 110.

2) Components (a-2) to (a-5)

Fluoroolefin copolymer varnishes were prepared in the same manner as in preparation of the component (a-1) with the exception of using the monomers given in Table 2 in the listed amounts (in parts).

In this example, 11 parts of succinic anhydride and 0.1 part of zirconium naphthenate were added to 200 parts of the varnish (a-3) obtained (100 parts of olefin copolymer calculated as solids), followed by reaction at about 80° C. for 5 hours to give a fluoroolefin copolymer-containing varnish containing about 53% of solids and having carboxyl introduced into the copolymer. The copolymer obtained was about 55 in acid value and about 197 in hydroxy value.

TABLE 2

|  | a-2 | a-3 | a-4 | a-5 |
|---|---|---|---|---|
| Monochlorotrifluoroethylene |  |  | 53 |  |
| Tetrafluoroethylene |  | 56 |  | 62 |
| Monofluoroethylene | 72 |  |  |  |
| 2-Hydroxyethyl vinyl ether | 8 | 44 | 27 |  |
| ω-Hydroxybutyl vinyl ether |  |  |  | 38 |
| Ethyl vinyl ether |  |  | 13 |  |
| Methyl vinyl ether | 10 |  |  |  |
| Cyclohexyl vinyl ether | 10 |  |  |  |
| Vinyl acetate |  |  | 7 |  |
| Succinic anhydride (per 100 parts of resin) |  | 11 |  |  |
| Hydroxy value (mg/KOH g-resin) | 51 | 197 | 172 | 183 |

2. Preparation of Component (d)

1) Component (d-1)

With 190 parts (resin solids 100 parts) of the varnish of carboxyl-containing fluoroolefin copolymer obtained in the preparation of (a-3) were admixed 100 parts of "Silaplane FMO511" (see Note 1) and 0.2 part of tetraethylammonium bromide, and the mixture was reacted at 120° C. for 4 hours to obtain a graft copolymer, which was 126 in hydroxy value.

(Note 1)

"Silaplane FMO511": brand name of glycidyl-containing reactive silicone manufactured by Chisso Corporation, Japan, having a molecular weight of about 1000 and represented by the formula:

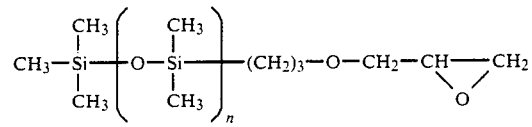

wherein n is about 11 on the average.

2) Component (d-2)

With 22 parts of isophorone diisocyanate were admixed 500 parts of "Silaplane FMO421" (see Note 2) and 0.05 part of dibutyl tin oxide, and the mixture was stirred at 80° C. for 3 hours for reaction, giving a silicone compound having one free isocyanate group.

To 200 parts (resin solids 100 parts) of the fluoroolefin copolymer varnish obtained in the preparation of (a-5) was added 15.4 parts of the silicone compound prepared above, followed by reaction at 80° C. for 3 hours to obtain graft copolymer, which was 157 in hydroxy value.

(Note 2)

"Silaplane FMO421": brand name of hydroxyl-containing reactive silicone manufactured by Chisso Corporation, Japan, having a molecular weight of about 5000 and represented by the formula:

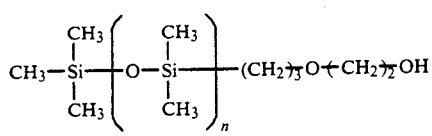

wherein n is about 65 on the average.

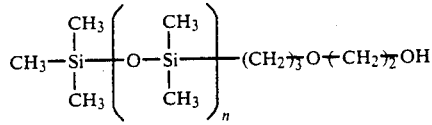

wherein n is about 133 on the average.

(Note 4)

"Coronate #2096": isocyanurate which is trimer of hexamethylene diisocyanate, product of Nippon Industry Polyurethane Co., Ltd.

3) Compositions (A-3) to (A-5) and (B-1) to (B-5)

Anti-icing compositions were prepared in the same manner as in the preparation of anti-icing composition (A)-1 in a listed ratio in Table 3.

3. Preparation of Composition for forming the Anti-icing layer

1) Composition (A-1)

With 18.8 parts of xylylene diisocyanate were admixed 500 parts of "Silaplane FMO421" and 0.05 part of dibutyl tin oxide, and the mixture was stirred at 80° C. for 3 hours for reaction, giving a silicone compound (b-1) having one free isocyanate group.

A coating composition of the three-package type was prepared which was composed of the fluoroolefin copolymer obtained in the preparation of (a-1), the silicone compound (b-1) obtained above and hexamethylene diisocyanate (component (c)). These components were mixed together in the fluoroolefin copolymer (a-1)/silicone compound (b-1)/hexamethylene diisocyanate (component (c)) ratio by weight of 50/32/18 calculated as solids.

2) Composition (A-2)

With 59.6 parts of a trifunctional isocyanate prepared by adducting 3 moles of hexamethylene diisocyanate to 1 mole of trimethylolpropane were admixed 1000 parts of "Silaplane FMO425" (Note 3) and 0.1 part of dibutyl tin oxide, and the mixture was reacted with stirring at 80° C. for 3 hours, giving a silicone compound (b-2) having two free isocyanate groups.

A coating composition of the three-package type was prepared which was composed of the fluoroolefin copolymer obtained in the preparation of (a-2), the silicone compound (b-2) prepared above and "Coronate #2096" (component (c)) (Note 4). These components were mixed together in the fluoroolefin copolymer (a-2)/silicone compound (b-2)/"#2096" (component (c)) ratio by weight of 83/4/13 calculated as solids.

(Note 3)

"Silaplane FMO425": brand name of hydroxyl-containing reactive silicone manufactured by Chisso Corporation, Japan, having a molecular weight of about 10000 and represented by the formula:

TABLE 3

| Anti-icing Comp. No. | A-3 | A-4 | B-1 | B-2 | B-3 | B-4 | A-5 |
|---|---|---|---|---|---|---|---|
| Component (a) or (d) Kind (Prep Ex. No.) | (a-3) | (a-4) | (d-1) | (d-2) | (d-2) | (d-1) | (a-3) |
| Amount (solids, part) | 49 | 60 | 80 | 64 | 54 | 68 | 34 |
| Component (b) Kind | Silaplane FMO411(*2) | Silaplane FMO425 | — | — | — | — | Silaplane FMO411(*2) |
| Amount (solids, part) | 26 | 10 | — | — | — | — | 33 |
| Component (c) Kind | IPDI (*1) | Coronate #2096 | IPDI (*1) | (c-1) | (c-2) (*3) | (c-3) (*4) | (c-3) (*4) |
| Amount (solids, part) | 25 | 30 | 20 | 36 | 46 | 32 | 33 |
| Type | Two-package | Two-package | Two-package | Two-package | Single-package | Single-package | Single-package |

In Table 3, the marks (*1) to (*4) stand for the following.

(*1) IPDI: isophorone diisocyanate (*2) "Silaplane FMO411": hydroxyl-containing reactive silicone manufactured by Chisso Corporation, Japan, having a molecular weight of about 1000 and represented by the formula:

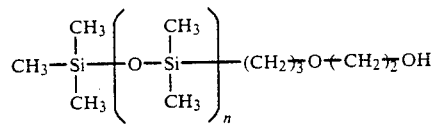

wherein n is about 11 on the average.

(*3) (c-2): Blocked isocyanate of the trifunctional isocyanate (c-1) used for preparing composition (A-2) and blocked with ε-caprolactam.

(*4) (c-3): Blocked isocyanate of isophoronediisocyanate blocked with ε-pcaprolactam.

EXAMPLE 1

To one side of a base sheet made of plasticated vinyl chloride resin (50 μm in thickness) was applied an adhesive agent (−50° C. in glass transition temperature) containing poly-2-ethylhexyl acrylate as the main component to give an adhesive layer having a 30 μm thickness. To the surface of the adhesive layer was adhered a release paper (200 μm in thickness) impregnated with a silicone resin. The composition (A-1) was applied to the other surface of the base sheet in an amount of 150 g/m² to a dry thickness of 40 μm. The coating layer was heated at 80° C. for 20 minutes for drying, giving a specimen of anti-icing adhesive sheet of the invention.

EXAMPLES 2 to 9

Anti-icing adhesive sheet specimens were prepared in the same manner as in Example 1 under the conditions as shown below in Table 4.

TABLE 4

|  | Example |  |  |  |  |  |  |  |
|---|---|---|---|---|---|---|---|---|
|  | 2 | 3 | 4 | 5 | 6 | 7 | 8 | 9 |
| Release paper |  |  |  |  |  |  |  |  |
| Composition | SRIP*1 | SRIP | SRIP | SRIP | SRIP | SRIP | SRIP | SRIP |
| Thickness (μm) | 200 | 200 | 180 | 180 | 200 | 200 | 180 | 180 |
| Adhesive agent |  |  |  |  |  |  |  |  |
| Composition | As in Ex. 1 | As in Ex. 1 | As in Ex. 1 | As in Ex. 1 | PBAE*4 | PBAE | PBAE | PBAE |
| Film thickness (μm) | 30 | 30 | 30 | 30 | 30 | 30 | 30 | 30 |
| Base sheet |  |  |  |  |  |  |  |  |
| Composition | VCR*2 | AUR*3 | AUR | VCR | VCR | VCR | VCR | VCR |
| Thickness (μm) | 30 | 50 | 100 | 50 | 50 | 50 | 50 | 50 |
| Anti-icing comp. |  |  |  |  |  |  |  |  |
| Composition | A-2 | A-3 | A-4 | B-1 | B-2 | B-3 | B-4 | A-5 |
| Film thickness (μm) | 40 | 40 | 40 | 30 | 40 | 30 | 40 | 40 |

*1 SRIP: Silicone resin-impregnated paper
*2 VCR: Vinyl chloride resin
*3 AUR: Acrylic urethane resin
*4 PBAE: Polybutyl acrylate emulsion

III. Results of performance tests

The test method is described below with reference to FIG. 2.

The anti-icing adhesive sheet specimens prepared in the Examples according to the invention were adhered to steel panels each by peeling a release sheet (1) and sticking a pressure-sensitive adhesive layer (2) to the steel panel, whereby test panels (10) were prepared.

The test panels (10) used for the test include those provided just after application of the anti-icing adhesive sheet, those exposed to weather for 3 months and those immersed in running water for 45 days after application of the anti-icing adhesive sheet.

A stainless steel ring (11) (5 cm² in inside area) was placed on the anti-icing layer (4) of the test panel (10) and the panel was introduced into a constant temperature chamber for refrigeration test at −10° C. and precooled therein for 90 minutes. Then 2 ml of distilled deionized water maintained at 5° C. was poured into the area inside the ring to form ice on the specimen, giving ice (12) kept in contact with the surface of anti-icing layer (4). The specimen with the ice (12) formed thereon was left to stand at −10° C. for 2 hours and then attached to a load cell (not shown). Impact was applied to the ring with use of a power-driven operative rod (13) made of metal to determine the shear strength (unit: kg/cm²) involved in separating the ice (12) from the specimen. Table 5 shows the results.

TABLE 5

|  | Example |  |  |  |  |  |  |  |  |
|---|---|---|---|---|---|---|---|---|---|
|  | 1 | 2 | 3 | 4 | 5 | 6 | 7 | 8 | 9 |
| Shear strength at ice-coating interface (kg/cm²) |  |  |  |  |  |  |  |  |  |
| Test Panel |  |  |  |  |  |  |  |  |  |
| Upon application of sheet | 0.8 | 1.0 | 1.2 | 1.0 | 0.8 | 0.9 | 1.2 | 0.8 | 1.0 |
| 3-month weather exposure | 0.9 | 1.2 | 1.2 | 1.1 | 1.0 | 1.1 | 1.2 | 1.2 | 1.1 |
| 45-day immersion in running water | 0.7 | 1.5 | 1.3 | 1.2 | 1.0 | 1.3 | 1.4 | 1.2 | 1.3 |

We claim:

1. An adhesive sheet for preventing icing, the sheet being characterized in that the sheet comprises a release sheet (1), a pressure-sensitive adhesive layer (2) formed on the sheet (1), a base sheet (3) adhered to the layer (2) and an anti-icing layer (4) formed on the base sheet (3) and that the anti-icing layer (4) is formed from a composition (A) or a composition (B), the composition (A) consisting essentially of:
(a) a copolymer having hydroxyl, or hydroxyl and other reactive group and comprising as essential monomer components a fluoroolefin and a vinyl monomer having hydroxyl and copolymerizable with the fluoroolefin,
(b) a silicone compound represented by the formula

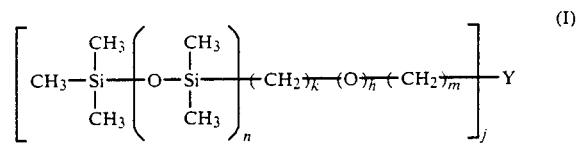

(I)

wherein n is an integer of 6 to 300, k is an integer of 0 to 6, h is 0 or 1, m is an integer of 0 to 6, j is 1 or 2, and Y is hydroxyl, carboxyl, epoxy, or a monovalent or bivalent group containing one or two free isocyanate groups, and
(c) a polyisocyanate compound, and the composition (B) consisting essentially of:
(d) a graft copolymer prepared by reacting the component (a) and the component (b), and
(c) the polyisocyanate compound.

2. A sheet as defined in claim 1 wherein the fluoroolefin as the essential monomer component of the copolymer (a) is at least one compound selected from hexafluoropropene, tetrafluoroethylene, monochlorotrifluoroethylene, dichlorodifluoroethylene, 1,2-difluoroethylene, vinylidene fluoride and monofluoroethylene.

3. A sheet as defined in claim 1 wherein the hydroxyl-containing vinyl monomer as the essential monomer component of the copolymer (a) is at least one compound selected from hydroxyethyl vinyl ether, hydroxypropyl vinyl ether, hydroxybutyl vinyl ether, hydroxyhexyl vinyl ether, hydroxypentyl vinyl ether, 2-hydroxyethyl acrylate, 2-hydroxyethyl methacrylate, hydroxypropyl acrylate, hydroxypropyl methacrylate, hydroxybutyl acrylate and hydroxybutyl methacrylate.

4. A sheet as defined in claim 1 wherein the copolymer (a) has carboxyl and/or epoxy as the reactive group.

5. A sheet as defined in claim 1 wherein the copolymer (a) has a number average molecular weight of about 2000 to about 100000.

6. A sheet as defined in claim 1 wherein the copolymer (a) has hydroxyl, and the Y group in the silicone compound (b) of the formula (I) is a monovalent or bivalent group having one or two free isocyanate groups.

7. A sheet as defined in claim 1 wherein the copolymer (a) has carboxyl, and the Y group in the silicone compound (b) of the formula (I) is epoxy.

8. A sheet as defined in claim 1 wherein the silicone compound (b) has a number average molecular weight of about 520 to about 60000.

9. A sheet as defined in claim 1 wherein the graft copolymer (d) is prepared by reacting about 42 to about 99% by weight of the component (a) with about 1 to about 58% by weight of the component (b).

10. A sheet as defined in claim 1 wherein the polyisocyanate compound (c) is a blocked polyisocyanate compound.

11. A sheet as defined in claim 1 wherein the components (a), (b) and (c) are used in the ratio of about 30 to about 90% by weight of component (a), about 1 to about 40% by weight of component (b) and about 5 to about 50% by weight of component (c) calculated as solids and based on the combined amount of the three components.

12. A sheet as defined in claim 1 wherein the components (d) and (c) are used in the ratio of about 50 to about 95% by weight of the component (d) and about 5 to about 50% by weight of the component (c) calculated as solids and based on the combined amount of the two components.

* * * * *